(12) United States Patent
Reese et al.

(10) Patent No.: US 11,292,158 B2
(45) Date of Patent: Apr. 5, 2022

(54) METHOD FOR REPROCESSING FIBER-COMPOSITE PARTS TO FORM PREFORM PARTS

(71) Applicant: Arris Composites Inc., Berkeley, CA (US)

(72) Inventors: Riley Reese, Carpinteria, CA (US); Ethan Escowitz, Berkeley, CA (US); Erick Davidson, Piedmont, CA (US); J. Scott Perkins, Berkeley, CA (US)

(73) Assignee: Arris Composites Inc., Berkeley, CA (US)

( * ) Notice: Subject to any disclaimer, the term of this patent is extended or adjusted under 35 U.S.C. 154(b) by 50 days.

(21) Appl. No.: 16/601,985

(22) Filed: Oct. 15, 2019

(65) Prior Publication Data

US 2020/0114545 A1 Apr. 16, 2020

Related U.S. Application Data

(60) Provisional application No. 62/744,785, filed on Oct. 12, 2018.

(51) Int. Cl.
*B29B 11/16* (2006.01)
(52) U.S. Cl.
CPC .................. *B29B 11/16* (2013.01)
(58) Field of Classification Search
CPC .................................................... B29B 11/16
See application file for complete search history.

(56) References Cited

U.S. PATENT DOCUMENTS

| 5,207,963 | A | * | 5/1993 | Grace | B29C 51/262 |
| | | | | | 264/163 |
| 7,888,274 | B2 | * | 2/2011 | Tsuji | D03D 15/00 |
| | | | | | 442/59 |
| 9,457,521 | B2 | * | 10/2016 | Johnston | C22C 47/04 |
| 2018/0229393 | A1 | * | 8/2018 | Corden | B29B 17/00 |

OTHER PUBLICATIONS

International Search Report issued in PCT Patent Application No. PCT/US2019/056247 dated Jan. 24, 2020.
Miracle D B et al., "Composites, Recycling and Disposal of Polymer-Matrix Composites", Dec. 1, 2001.
Steenkamer David A et al., "On the Recyclability of a cyclic thermoplastic composite material" Composites Part B, May 24, 1998, pp. 745-752, vol. 29/No. 6.

* cited by examiner

*Primary Examiner* — Matthew J Daniels
*Assistant Examiner* — Shibin Liang
(74) *Attorney, Agent, or Firm* — Kaplan Breyer Schwarz, LLP

(57) ABSTRACT

A method of reprocessing a fiber composite part to form a preform is provided including determining a location having a longest stretch of continuous, unidirectional fibers in the part, determining an axis generally closest to and parallel to the fibers at the location, suspending the part from an anchor point within a heated cavity, heating the part to a temperature above a glass transition temperature and below a melting temperature of the resin of the part, and applying at least one force vector to the composite part, the sum of such vectors being parallel to the axis, wherein fibers of the part realign in a direction generally parallel to the sum of the force vectors, and wherein the composite part yields in the direction of the at least one applied force vector to provide a preform.

22 Claims, 8 Drawing Sheets

METHOD FOR REPROCESSING FIBER-COMPOSITE PARTS TO FORM PREFORM PARTS

CROSS-REFERENCE TO RELATED APPLICATION

This application claims priority to U.S. Provisional Patent Application No. 62/744,785, entitled Method for Fiber Alignment and Reprocessing, filed Oct. 12, 2018, the entire disclosure of which is incorporated by reference herein.

FIELD OF THE INVENTION

The present invention relates to fiber-composite parts. More particularly, the present invention relates to reprocessing of fiber-composite parts.

BACKGROUND

A fiber composite includes fibers that are dispersed within a matrix. The matrix, which is a polymer resin, surrounds and supports the fibers by maintaining theft relative positions, in addition to preventing the fibers from abrasion and environmental attack. The fibers impart theft mechanical and physical properties to enhance those of the matrix. The combination is synergistic; the composite possesses material properties unavailable from the individual constituents, such as an exceptionally high strength-to-weight ratio.

Fiber composites derive this synergism from strong interfacial adhesion between the matrix and the fiber, which is necessary to effectively transfer loads to the embedded fibers. Strong interfacial adhesion requires that the fibers are adequately wet by the matrix. Matrix materials having relatively high flowability and relatively low surface tension promote wetting. Because polymers possess these properties, in addition to other desirable attributes, they are typically used as the matrix.

It would be advantageous to be able to reprocess a fiber composite part, such that, after the useful life of the part ends, the part is reprocessed to obtain a new part.

In the prior art, carbon fiber reinforced polymers (CFRPs) are generally reprocessed in one of two ways: (i) by reducing parts to small pieces that can generally fill any mold with a correct quantity, or (ii) by removing the polymer chains, through energy-intensive chemical or pyrolysis methods, and salvaging the remaining carbon fibers for reprocessing.

In the first approach—pulverization—CFRP parts are chopped or shredded into small chips or powder of equal constituency to the original part. The smaller geometries produced from this method are then reused to mold new parts. Using heat and pressure, a wide range of different parts can also be converted to a standard pellet shape after pulverization. The method is generally destructive, and fiber lengths are inevitably and undesirably substantially shortened.

In the second approach—polymer removal—CFRP parts undergo a variety of polymer-specific chemical processes that share the common goal of removing the thermoplastic polymer chains. While the methods vary, the end result is a collection of bare fibers. These methods are all constrained in that they cannot recover 100% of the original fiber. A pyrolysis process can be used that burns off the polymer chains but not the fibers, thereby recovering all the fiber, but fiber quality is degraded.

All references cited herein are incorporated herein by reference in their entireties.

SUMMARY

Fiber-composite parts utilize fiber-alignment techniques that result in parts exhibiting superior mechanical properties. The present invention is directed to fiber-alignment in the reprocessing of parts. In particular, the present reprocessing method realigns the fibers in the formed parts (the parts being reprocessed) into sections of generally unidirectional fiber-alignment preforms. This facilitates molding a new part with different aligned fiber geometries.

The present invention is directed to fiber-alignment and preservation of length of fibers in the reprocessing of parts. There would be a benefit if a reprocessing technique could recover unidirectional, fiber-aligned preforms. The present invention provides a reprocessing method that is capable of realigning the fibers in previously formed parts (the parts being reprocessed) into sections of unidirectional fiber-aligned preforms, while substantially preserving the length of the fibers of the previously formed parts. This facilitates molding a new part with different aligned fiber geometries.

In accordance with the present teachings, by applying forces to a heated section of a previously molded part, the part is converted into a generally unidirectional fiber preform, irrespective of initial fiber orientation in the previously molded part. By converting existing parts back into a continuous, unidirectional fiber preform, irrespective of the initial fiber alignment, embodiments of the invention are able to lengthen the life cycle of high-performance structural components. Without this method, reprocessed carbon-fiber thermoplastic composites, for example, are limited to randomized fiber orientation or energy intensive polymer removal, and thus inferior in performance relative to continuous, aligned-fiber parts.

In an exemplary embodiment of the present invention, the present invention is directed to a method of reprocessing a fiber composite part to form a preform having long, generally aligned fibers. The method first includes the steps of determining a location having a longest stretch of continuous, unidirectional fibers in the composite part, determining an axis generally closest to and parallel to the fibers at the location, and suspending the composite part from an anchor point within a heated cavity. The method continues with the steps of heating the composite part to a temperature above a glass transition temperature and below a melting temperature of the thermoplastic resin, and applying at least one force vector to the composite part, the sum of the force vectors being parallel to the determined axis, wherein fibers of the composite part realign in a direction generally parallel to the sum of the force vectors, and wherein the composite part yields in the direction of the sum of the force vectors. It is noted that the order of the steps is not critical. For example, the steps of heating the composite part and applying the at least one force may be reversed.

A step of cooling the composite part may be included after the step of applying the force vector. A step of applying at least one force vector may be accomplished using, for example, at least one spring, a magnetic field, or a weight. The step of heating may include heating with a radiant heater, a microwave heater, a laser heater, an induction heater, and/or an infrared heater. The step of applying at least one force vector may include applying force vectors along a single axis or along multiple axes. The step of applying at least one force vector may include sequentially applying more than one force vector.

In another exemplary embodiment of the present invention, a method of reprocessing a composite part to form a preform is provided where the composite part includes fibers and thermoplastic resin. The method includes the steps of heating the composite part to a temperature above a glass transition temperature and below a melting temperature of the thermoplastic resin and applying force to the composite part along one or more axes, the applied force resulting in realignment of the fibers in a direction substantially parallel to a net direction of the applied force. The step of applying force may include applying multiple forces simultaneously or sequentially. It is noted that the order of the steps is not critical. For example, the steps of heating the composite part and applying the at least one force may be reversed.

In another exemplary embodiment of the present invention, a method of reprocessing a composite part to form a preform is provided where the composite part includes fibers and thermoplastic resin. The method include the steps of defining a realignment axis as an axis proximal and parallel to a location of the composite part having a longest stretch of continuous, unidirectional fibers, heating the composite part to a temperature above a glass transition temperature and below a melting temperature of the thermoplastic resin, and applying force to the composite part along one or more axes selected to cause the fibers to align with the realignment axis. The step of applying force may include applying multiple forces either simultaneously or sequentially. It is noted that the order of the steps is not critical. For example, the steps of heating the composite part and applying the at least one force may be reversed.

Finally, in another exemplary embodiment of the present invention, a method of reprocessing a composite part to form a preform is provided where the composite part including fibers and thermoplastic resin. The method includes the steps of determining an average direction of longest continuous fibers in the composite part, determining an axis generally closest to and parallel to the fibers at the direction, suspending the composite part from an anchor point within a heated cavity, heating the composite part to a temperature above a glass transition temperature and below a melting temperature of the thermoplastic resin, and applying at least one force vector to the composite part, the sum of the at least one force vectors being parallel to the determined axis, wherein fibers of the composite part realign in a direction generally parallel to the sum of the force vectors, and wherein the composite part yields in the direction of sum of the force vectors. It is noted that the order of the steps is not critical. For example, the steps of heating the composite part and applying the at least one force may be reversed.

A step of cooling the composite part may be included after the step of applying the force vector. A step of applying at least one force vector may be accomplished using, for example, at least one spring, a magnetic field, or a weight. The step of heating may include heating with a radiant heater, a microwave heater, a laser heater, an induction heater, and/or an infrared heater. The step of applying at least one force vector may include applying force vectors along a single axis or along multiple axes. The step of applying at least one force vector may include sequentially applying more than one force vector.

Additional embodiments of the invention comprise any other non-conflicting combination of features recited in the above-disclosed embodiments and in the Detailed Description below.

BRIEF DESCRIPTION OF THE DRAWINGS

The invention will be described in conjunction with the following drawings in which like reference numerals designate like elements and wherein.

DETAILED DESCRIPTION OF THE INVENTION

Figure 1:
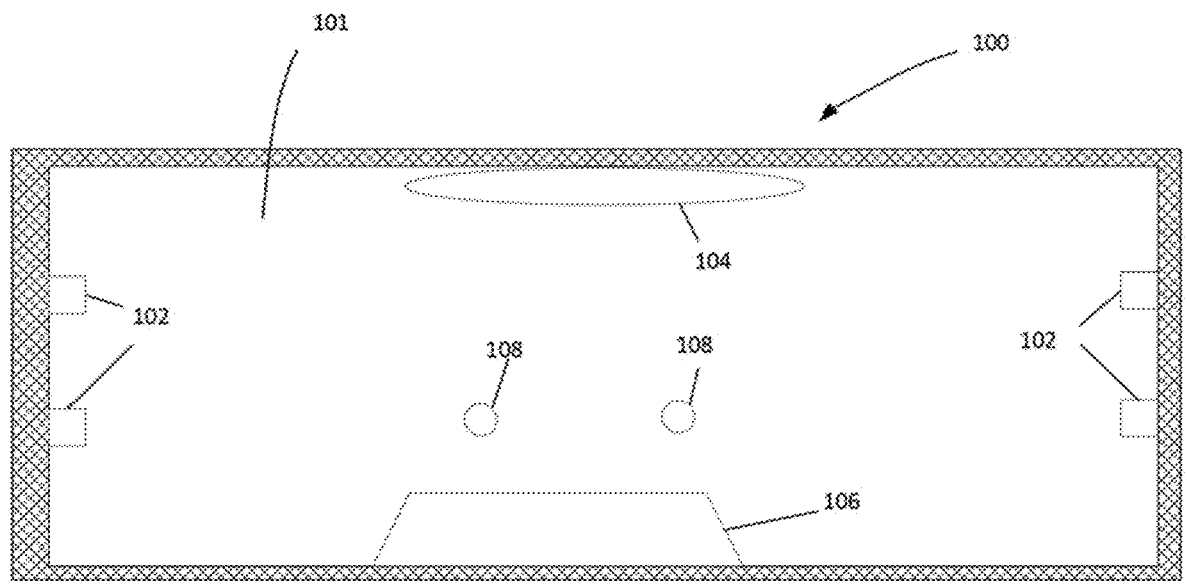
FIG. 1 is an apparatus for reprocessing fiber-composite parts to form a preform in accordance with an exemplary embodiment of the present invention.

The following terms, and their inflected forms, are defined for use in this disclosure and the appended claims as follows:

"Composite Part" means a part made from composite material made from two or more constituent materials with significantly different physical or chemical properties that, when combined, produce a material with characteristics different from the individual components. The individual components remain separate and distinct within the finished structure.

"Fiber" means an individual strand of material. A fiber has a length that is much greater than its diameter. In the context of composites, fibers are classified as (i) chopped/cut/discontinuous or (ii) continuous. Continuous fibers have a length that is comparable to the size of the part in which they are used. Continuous fibers usually have a defined orientation in the matrix or part. Orientation of the fibers in a part has a direct correlation to the material properties of the part, including, but not limited to strength, weak areas, warping, etc. Chopped fibers have a length that is typically much shorter than the part in which they are used and, in fact, the length of such fibers typically bear no predefined relationship to the length of any feature of a mold/part. Chopped fibers have a random orientation in the matrix or final part. As used herein, the term "fiber" means continuous fiber, unless modified by the term "chopped" or "cut".

"Preform" means altered (e.g., bent, sized, etc.) extrudate filament that is a pre-shaped fibrous reinforcement part formed to the approximate contour and thickness desired in the finished part before being placed in a mold press. The cross section of the extrudate filament has an aspect ratio (width:thickness) of between about 0.25 to about 6. The term preform explicitly excludes sized/shaped (i) tape (which typically has an aspect ratio—cross section, as above—of between about 10 to about 30), (ii) woven mats/sheets of fiber, and (iii) laminates.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

For purposes of the present invention, the terms "reprocessing" and "reclaiming" are intended to broadly have the same definition.

In accordance with the present invention, realignment of the fibers of a molded part is accomplished by placing the part into a closed space, wherein the closed space, and/or the part, is then heated above the glass transition temperature of the thermoplastic resin that forms the part, but below its melt temperature. By suspending the part and applying force along the desired axis of fiber realignment, the part and its constituent fibers are pulled and reshaped along the force axis. The anchoring points on the suspended part are chosen based on the desired final shape and fiber alignment. Pins, slots, and other alignment structures can also be used to aid in the control of the reforming and realignment process.

By heating above the glass transition temperature of the resin but below its melting temperature, the resin becomes formable (with application of force), but not yet liquid. This enables the part to yield in the direction of applied force. Maintaining the temperature below the melt-flow temperature is important to prevent the resin from flowing within the part thereby creating dry fiber regions and resin-rich regions. Since the part is suspended at key selected points, the only change in shape will correspond to the direction of applied force (and relative to any constraining features) and the direction of gravity.

Referring now to the drawing figures, wherein like reference numbers refer to like elements throughout the several views, there is shown in FIG. 1, an apparatus 100 for reprocessing fiber-composite parts to form a preform in accordance with an exemplary embodiment of the present invention. The apparatus 100 includes an enclosed space 101 suitable for receiving a least one fiber composite part for reprocessing in accordance with the method of the present invention. The enclosed space 101 includes anchor points 102 and a heating element 104, and may include a cooling apparatus 106 and alignment structures 108. The anchor points 102 are used to secure the composite part(s) inside the enclosed space 101 for reprocessing, as will be described in detail below.

Figure 2:
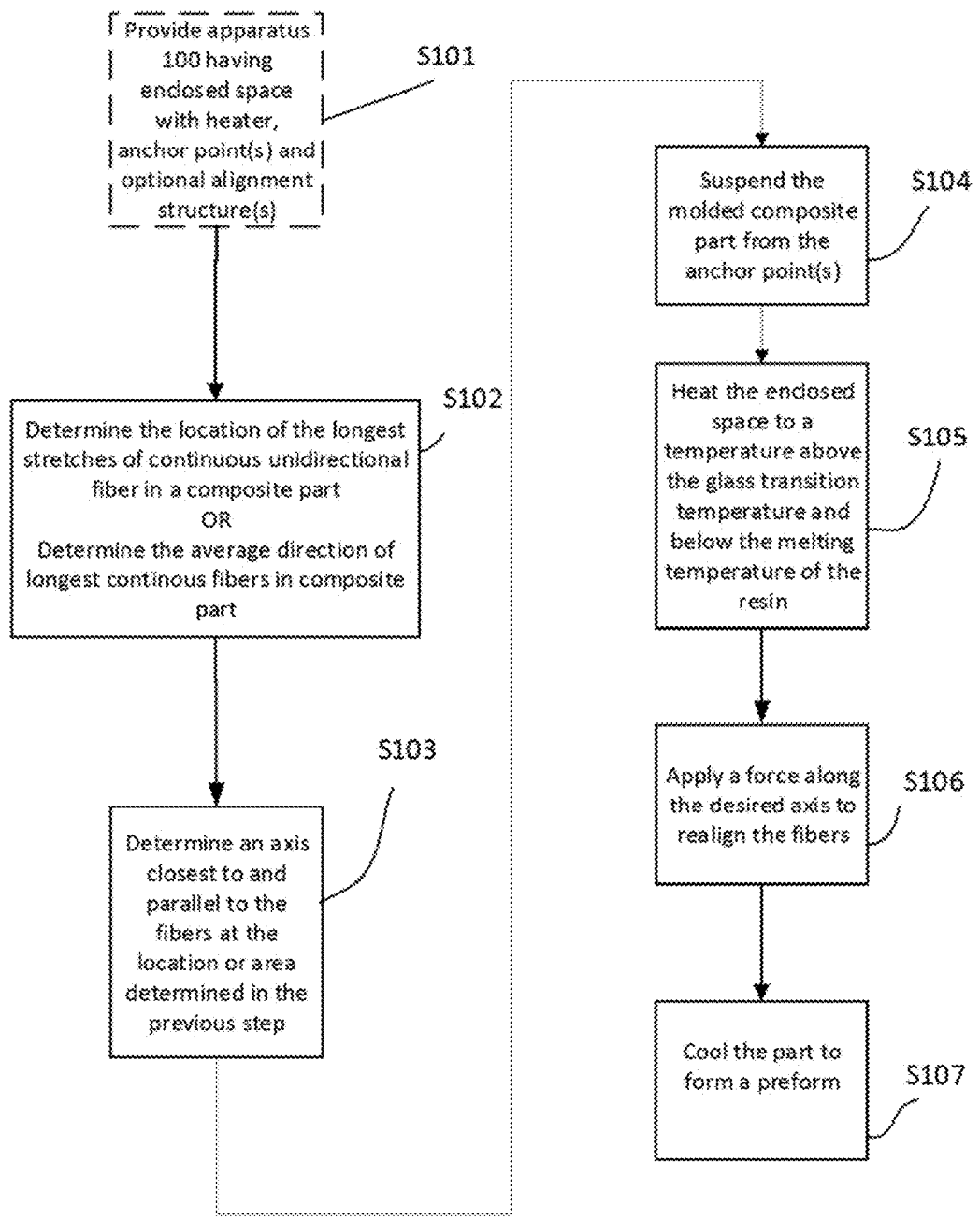
FIG. 2 is a flowchart of a method of reprocessing fiber-composite parts to form a preform in accordance with an exemplary embodiment of the present invention.

The method of reprocessing a composite part to form a preform of the present invention is shown in the flowchart of FIG. 2 and utilizes the apparatus 100 of FIG. 1 (step S101 in FIG. 2).

Figure 3:
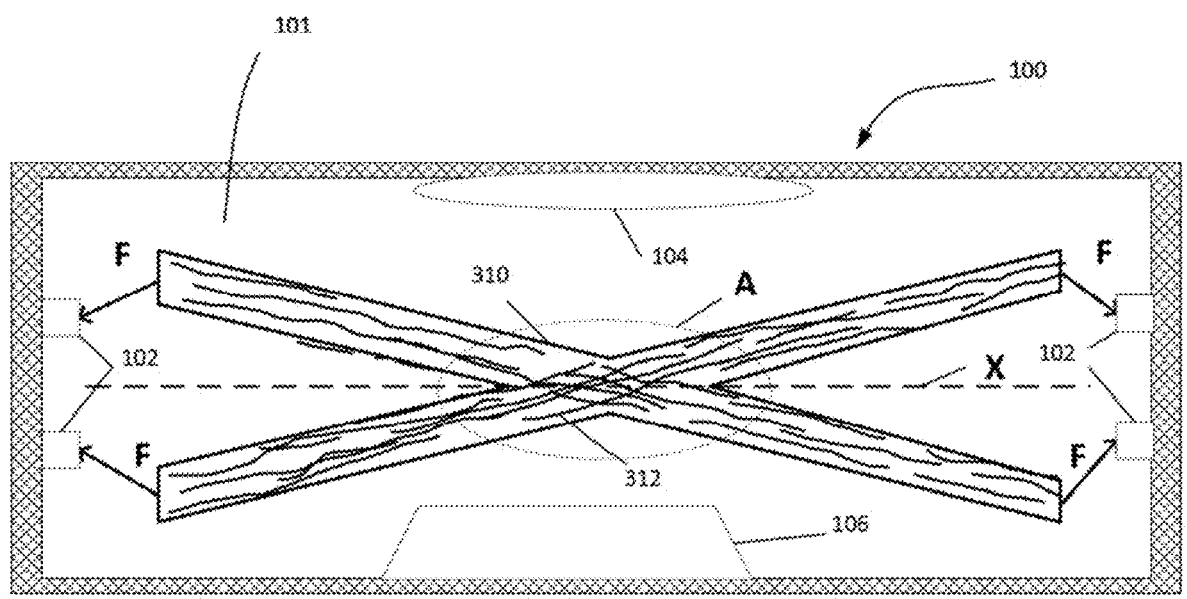
FIG. 3 depicts, in a first phase of a method for reprocessing fiber-composite parts to form a preform, as shown in FIG. 2, a previously molded part in a heated cavity with forces applied along a desired single realignment axis.

FIG. 3 depicts a previously molded composite part 310 provided for reprocessing in the apparatus 100 of FIG. 1 utilizing the method as described in FIG. 2. As seen in step S102, The method begins with a first step of determining where the longest stretches of continuous, unidirectional fibers are located in a composite part to be reprocessed. This location is designated as location A in FIG. 3). An axis X is determined that is generally parallel to and closest to the fibers at location A. Alternatively, rather than determining where the longest stretches of continuous unidirectional fibers are located, this step may be determining an average direction of longest continuous fibers in the composite part (also location A in FIG. 3), and then determining an axis generally closest to and parallel to the fibers at the average direction (also axis X in FIG. 3)

The method continues with the step of suspending the composite part 310 in the enclosed space 101 at the anchor points 102 (step S104). The anchor points 102 are positioned such that, when force vectors F are applied (described below) the sum of the force vectors F is applied along or parallel to axis X. Provision may be made to provide for various locations or adjustability of anchor points 102 within the enclosed space 101 to ensure that desired force vectors F can be established (step 103).

Heating is applied by heating element 104 of apparatus 100 to the composite part to a temperature above a glass transition temperature and below a melting temperature of the resin of the composite part (step S105). The glass transition temperature and melt temperature of the resin component of the composite part 310 are known physical properties. In the illustrative embodiment, the heating element may be one or more radiant heaters, or any other type of heater, as are well known in the prior art.

Finally, at least one force vector F (provided by spring(s), magnetic field(s), weight(s), etc.) is applied to the part (step S106). The sum of such force vectors F is parallel to the determined axis X, such that fibers 312 of the composite part 310 realign (without a reduction in length) in a direction generally parallel to the sum of the force vectors F. The composite part 310 yields in the direction of the applied force vectors F to yield a preform 414. When heated to the desired temperature and with the force vectors F applied, the molded composite part 310 will begin to displace in the direction of the sum of applied force vectors F. The process is continued until at least a section of the molded composite part 310 section has been substantially realigned along the force axis to create the preform 414 (see FIG. 4 and accompanying description below). It is noted that the order of the steps is not critical. For example, the steps of heating the composite part and applying the at least one force may be reversed.

A step of cooling (step S107), if desired, is applied by the cooling apparatus 106 as well known, inside the enclosed space 101 or outside of it. The cooling step causes the preform to re-solidify allowing the preform to be handled without deformation. Once cooled, the preform 414 (or a portion thereof) can be reprocessed as desired.

Figure 4:
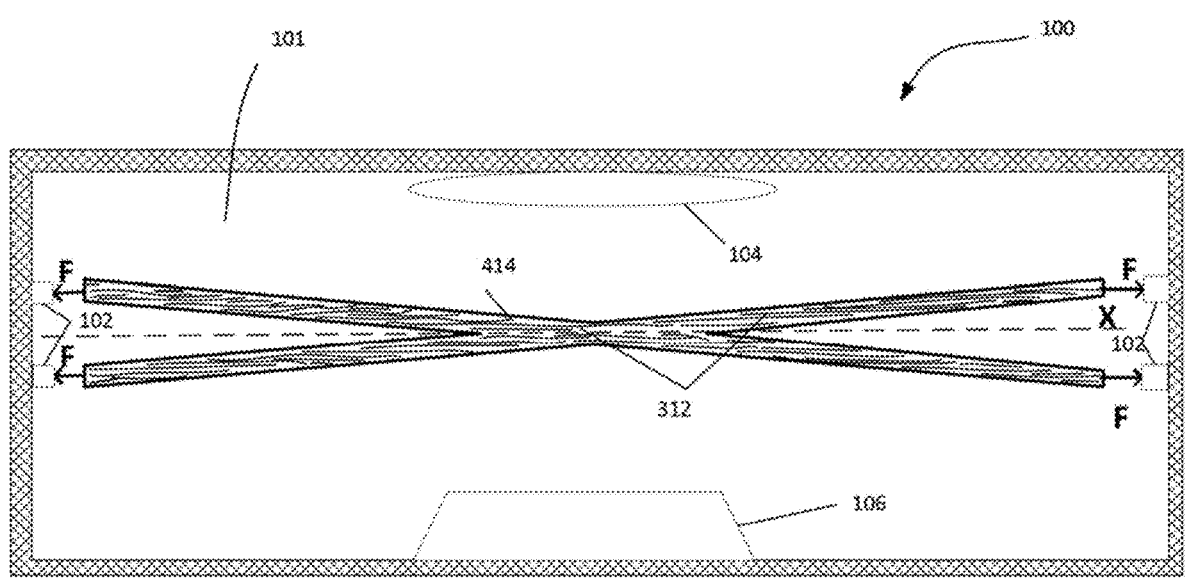
FIG. 4 depicts, in a second phase of the method of FIG. 2, the molded part of FIG. 3 conforming to the applied forces, thus approaching unidirectional fibers along the single realignment axis.

FIG. 4 depicts the newly created preform 414 with its fibers 312 shown in their realigned positions in apparatus 100.

The step of heating S105 the enclosed space may be accomplished with, for example, a radiant heater, a microwave heater, a laser heater, an induction heater, an infrared heater, or any other known heater that would operate effectively.

Figure 5:
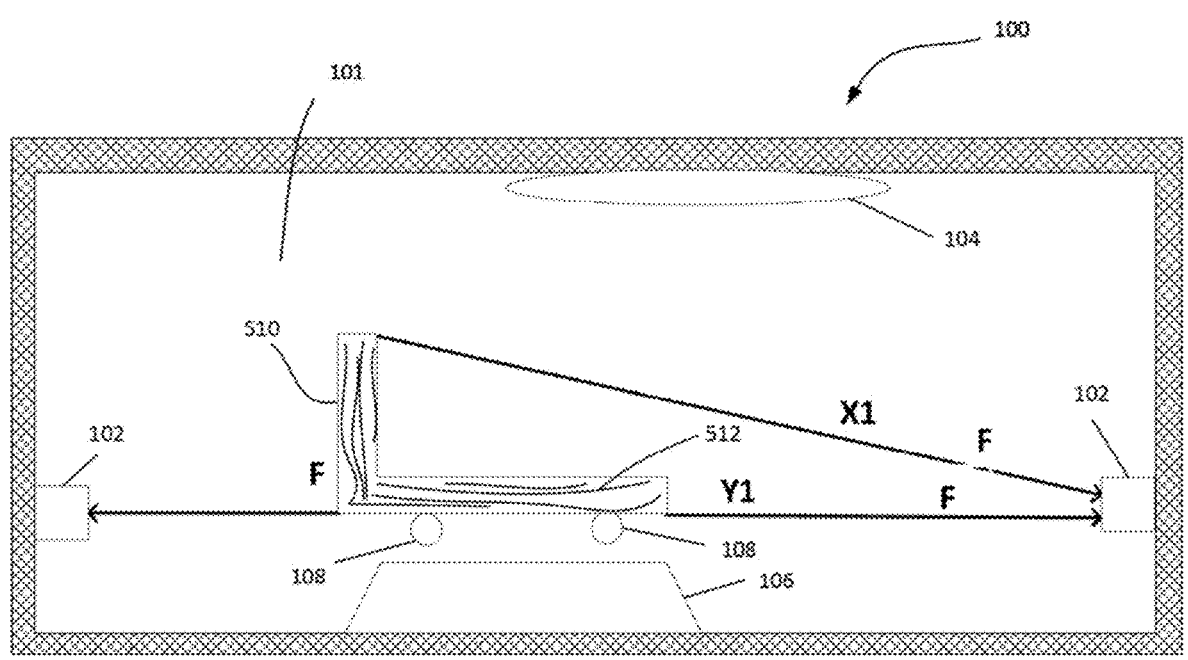
FIG. 5 depicts, in a first phase of a method for reprocessing fiber-composite, a previously molded part in a heated cavity with forces applied along a multiple realignment axes.
Figure 6:
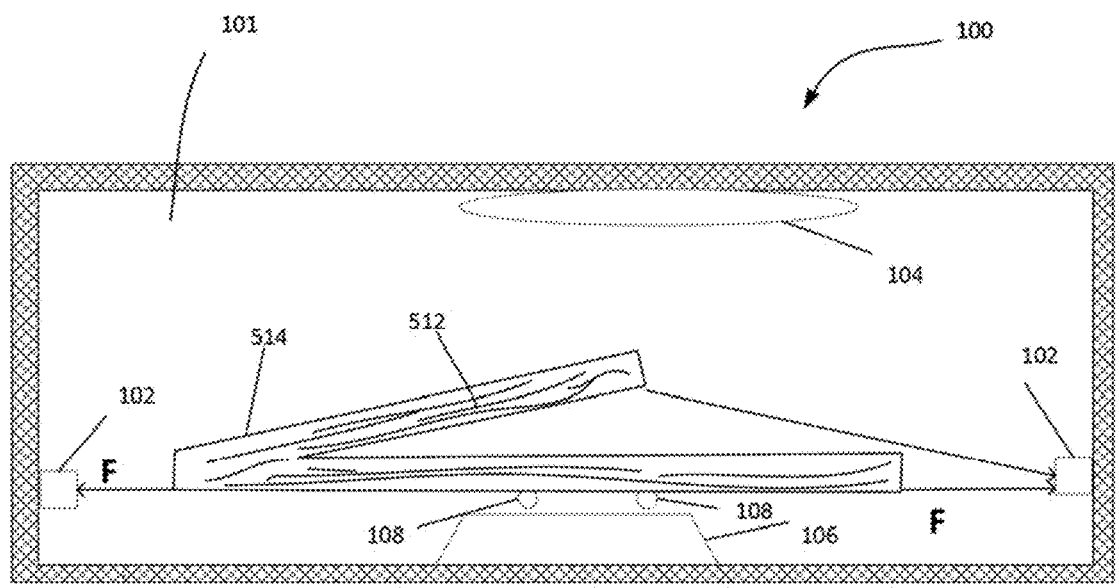
FIG. 6 depicts, in a second phase of the method of FIG. 2, the molded part of FIG. 5 conforming to the applied forces, thus approaching unidirectional fibers along multiple realignment axes.

FIG. 5 and FIG. 6, depict an alternate embodiment of the method of the present invention that generally corresponds to the initial state of FIG. 3 (i.e., a composite part 510 prior to reprocessing) and final state (i.e., a preform 514) of FIG. 4, respectively. Here, consolidation of material along multiple axes (for example, axis X1, and axis Y1) will result in generally unidirectional fiber alignment of at least some fibers 512 along such axes, by the same mechanism as described for the single force axis of FIGS. 2 and 3. Given the proper combination of applied forces and constraints, previously molded part sections can be reformed into a large range of reprocessed preform shapes.

As also shown in FIGS. 5 and 6, at least one alignment structure 108 (such as a pin slot) may be located within the enclosed space to assist in aligning the molded composite part.

While the force vectors F applied may be applied by typical springs (such as coil springs), it will be appreciated that any arrangement for applying an axial force, assuming proper magnitude, can suitably be used such as weights, magnetic fields, and the like, as are well known. In the figures, force vectors F are shown as vectors signifying coil springs, magnetic forces, or the like. Given the viscous nature of heated thermoplastic matrix, relatively little force is required to displace the material in the desired direction. The general application of force to a fiber composite heated above the glass transition temperature of the thermoplastic will result in deflection of the material in the direction of applied force.

Figure 7A:
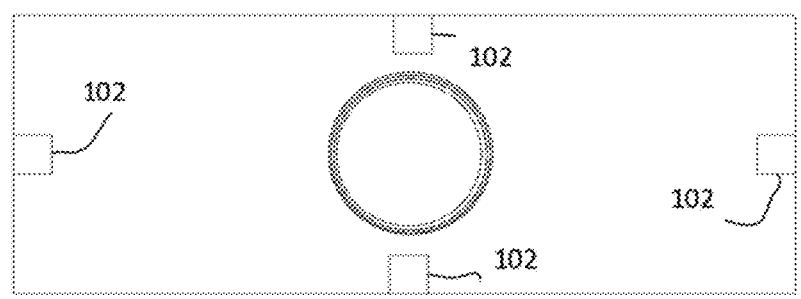
FIGS. 7A, 7B and 7C depict, in simplified form, in a first, second, and third phase, respectively, a previously molded part in a heated cavity wherein separate forces are applied sequentially to the composite part, thus providing realignment of fibers in multiple regions of the composite part.
Figure 7B:
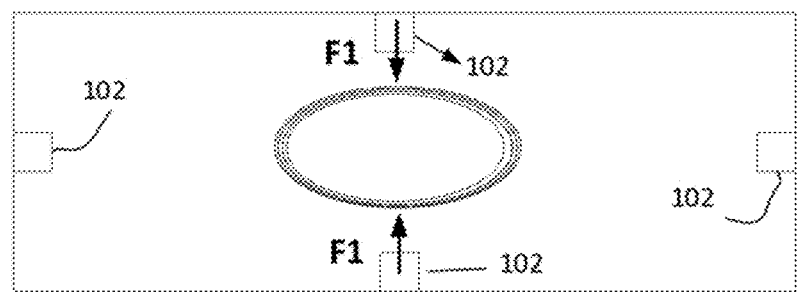
Figure 7C:
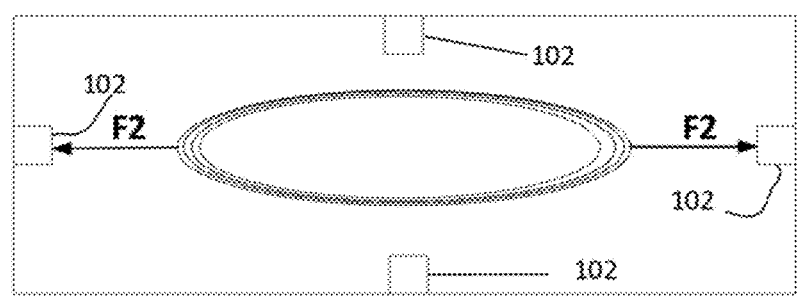

FIGS. 7A, 7B and 7C depict a variation of the present invention, as described above. Here, rather than force vectors F being applied simultaneously as in FIGS. 4-6, force vectors F1, F2 may be applied sequentially in order to facilitate more complex shapes that require more processing to obtain optimal realignment of fibers. FIG. 7A depicts a part prior to any forces applied. FIG. 7B depicts force vectors F1 applied in a first direction. FIG. 7C depicts second force vectors F2 applied in a second direction. Such sequential force vectors may be applied sequentially in, for example, two, three, or more directions depending upon the complexity of the part being reprocessed.

Figure 8:
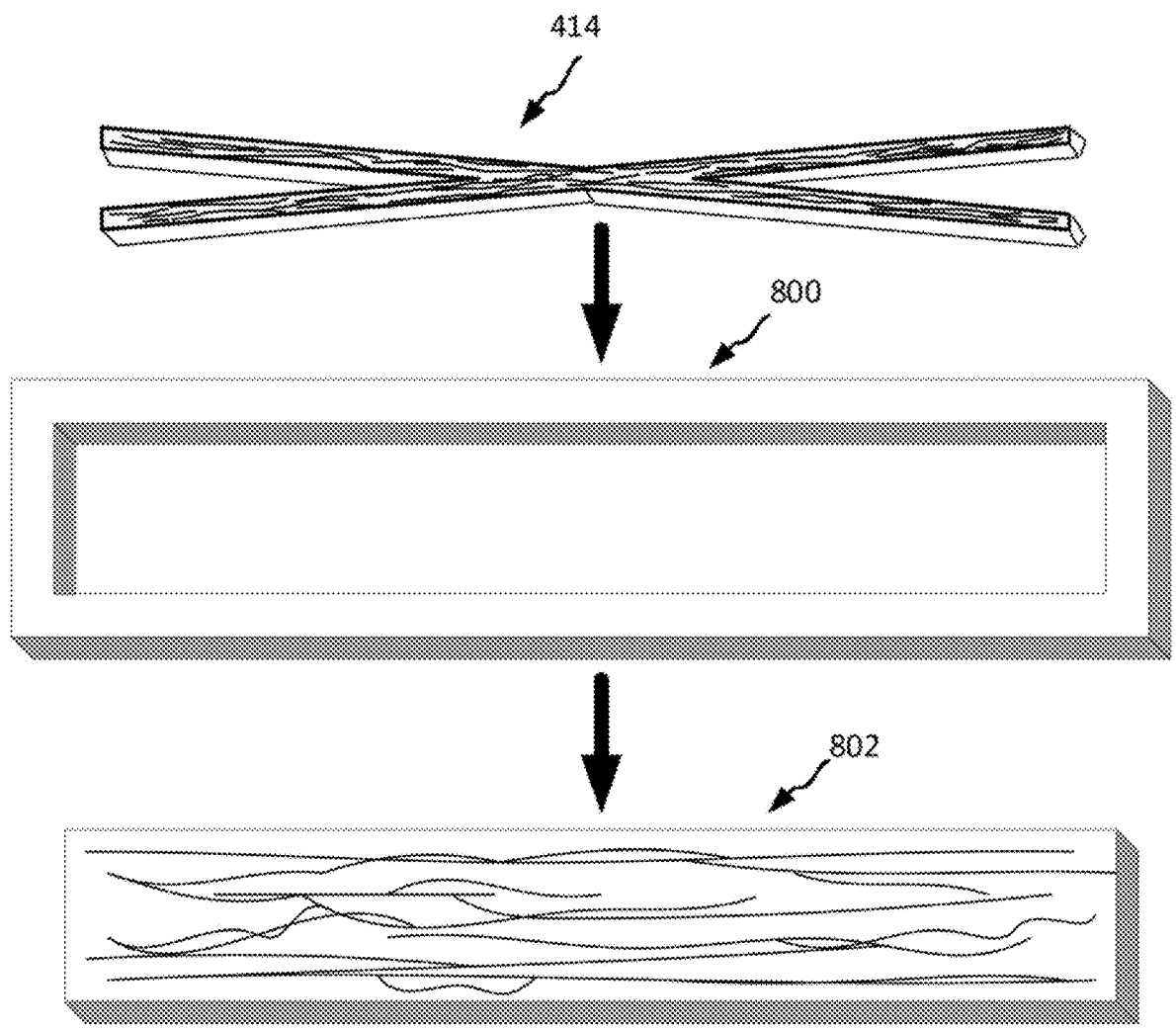
FIG. 8 depicts, in simplified form, a preform, made in accordance with the present invention, molded in a mold under heat and pressure to form a finished composite part.

FIG. 8 depicts a preform, made in accordance with a reprocessing method of the present invention, being used to make a final composite part. The preform 414 is placed in a mold 800 where heat and pressure are applied. A final composite part 802 is formed. The resulting composite part 802 from the reprocessed preform 414 may not have ideal material properties seen in a similar part made from virgin preforms having substantially perfect alignment. However, substantial economic benefits are obtained. Depending on the application, reprocessed preforms can also be used in combination with virgin preforms of the same polymer matrix—that is, virgin preforms can be used in regions with high performance criteria, and reprocessed preforms in low performance criteria regions to decrease overall cost. Since the reprocessed X preform may not have perfect unidirectional fiber alignment, the finished composite part 802 may not either. Fibers in the part, however, will still be long and largely aligned to its major axis. For example, a similar part made from virgin preforms may have 99% fiber alignment, whereas the reprocessed part may have 90%. Both will have fibers of equal length.

The reprocessing methods described herein applies to all thermoplastic composites, but may or may not apply to other types of polymers. Resins suitable for use in conjunction with embodiments of the invention include, without limitation: acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC).

The process is applicable to most fibers, including, without limitation, carbon, glass, natural fibers, aramid, boron, metal, ceramic, polymer filaments, metal-particle or ceramic-particle laden fibers, and others. Non-limiting examples of metal fibers include steel, titanium, tungsten, aluminum, gold, silver, alloys of any of the foregoing, and shape-memory alloys. "Ceramic" refers to ail inorganic and non-metallic materials, Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing.

A finished composite part created from a preform 414, 514 resulting from this method can itself be reprocessed a second time into yet another unidirectional preform. Generally, thermoplastics degrade slightly through successive melt and cool cycles, so the reprocessing life cycle is finite. Yet, in methods in accordance with the invention, the polymer is not converted into the melt phase, so no appreciable degradation occurs during the reforming and reprocessing step. As such, it is expected that the present method can reform and reprocess the same material many times.

In some embodiments, heating of the desired composite-part section in an enclosed space is accomplished by more selective heating methods, such as microwave, laser, induction, infrared, etc. The use of radiant heaters, as in the illustrative embodiment, ensures that the entire section will attain nearly the same temperature. But selective heating can be used to produce specific shapes as well as be used to maintain some shapes of the original part. However, any method that results in an isotherm across the material is equally viable, as long as the desired temperature can be controllably achieved.

While the invention has been described in detail and with reference to specific embodiments thereof, it will be apparent to one skilled in the art that various changes and modifications can be made therein without departing from the spirit and scope thereof.

What is claimed:

1. A method of reprocessing a previously formed composite part to form a preform, the composite part including fibers and thermoplastic resin, the method comprising:
   (a) determining a location having a longest stretch of continuous, unidirectional fibers in the previously formed composite part;
   (b) determining an axis generally closest to and parallel to the fibers at the location;
   (c) suspending the previously formed composite part from an anchor point within a heated cavity;
   (d) heating the previously formed composite part to a temperature above a glass transition temperature and below a melting temperature of the thermoplastic resin; and
   (e) applying at least one force vector to the previously formed composite part, the sum of the at least one force vectors being parallel to the determined axis, wherein fibers of the composite part realign in a direction generally parallel to the sum of the force vectors, and wherein the previously formed composite part yields in the direction of sum of the force vectors to form the preform.

2. The method of reprocessing a fiber composite part of claim 1, including the step of cooling the composite part after the step of applying the at least one force vector.

3. The method of reprocessing a fiber composite part of claim 1, wherein the step of applying at least one force vector is accomplished using at least one spring.

4. The method of reprocessing a fiber composite part of claim 1, wherein the step of applying at least one force vector is accomplished using a magnetic field.

5. The method of reprocessing a fiber composite part of claim 1, wherein the step of applying at least one force vector is accomplished using at least one weight disposed on the composite part.

6. The method of reprocessing a fiber composite part of claim 1, wherein the step of heating includes heating with a heater selected from the group consisting of a radiant heater, a microwave heater, a laser heater, an induction heater, and an infrared heater.

7. The method of reprocessing a fiber composite part of claim 1, wherein the step of applying at least one force vector includes sequentially applying more than one force vector.

8. The method of reprocessing a fiber composite part of claim 1, wherein the step of applying at least one force vector includes applying force vectors along a single axis.

9. The method of reprocessing a fiber composite part of claim 1, wherein the step of applying at least one force vector includes applying force vectors along a plurality of axes.

10. A method of reprocessing a previously formed composite part to form a preform, the previously formed composite part including fibers and thermoplastic resin, the method comprising:
heating the previously formed composite part to a temperature above a glass transition temperature and below a melting temperature of the thermoplastic resin;
applying force to the previously formed composite part along one or more axes, the applied force resulting in realignment of the fibers in a direction substantially parallel to a net direction of the applied force to form the preform.

11. The method of reprocessing a fiber composite part of claim 10, wherein the step of applying force vector includes sequentially applying more than one force.

12. A method of reprocessing a previously formed composite part to form a preform, the previously formed composite part including fibers and thermoplastic resin, the method comprising:
defining a realignment axis as an axis proximal and parallel to a location of the previously formed composite part having a longest stretch of continuous, unidirectional fibers;
heating the previously formed composite part to a temperature above a glass transition temperature and below a melting temperature of the thermoplastic resin;
applying force to the previously formed composite part along one or more axes selected to cause the fibers to align with the realignment axis to form the preform.

13. The method of reprocessing a fiber composite part of claim 12, wherein the step of applying force vector includes sequentially applying more than one force.

14. A method of reprocessing a previously formed composite part to form a preform, the previously formed composite part including fibers and thermoplastic resin, the method comprising:
(a) determining an average direction of longest continuous fibers in the previously formed composite part;
(b) determining an axis generally closest to and parallel to the fibers at the average direction;
(c) suspending the previously formed composite part from an anchor point within a heated cavity;
(d) heating the previously formed composite part to a temperature above a glass transition temperature and below a melting temperature of the thermoplastic resin; and
(e) applying at least one force vector to the previously formed composite part, the sum of the at least one force vectors being parallel to the determined axis, wherein fibers of the composite part realign in a direction generally parallel to the sum of the force vectors, and wherein the previously formed composite part yields in the direction of sum of the force vectors to form the preform.

15. The method of reprocessing a fiber composite part of claim 14, including the step of cooling the composite part after the step of applying the at least one force vector.

16. The method of reprocessing a fiber composite part of claim 14, wherein the step of applying at least one force vector is accomplished using at least one spring.

17. The method of reprocessing a fiber composite part of claim 14, wherein the step of applying at least one force vector is accomplished using a magnetic field.

18. The method of reprocessing a fiber composite part of claim 14, wherein the step of applying at least one force vector is accomplished using at least one weight disposed on the composite part.

19. The method of reprocessing a fiber composite part of claim 14, wherein the step of heating includes heating with a heater selected from the group consisting of a radiant heater, a microwave heater, a laser heater, an induction heater, and an infrared heater.

20. The method of reprocessing a fiber composite part of claim 14, wherein the step of applying at least one force vector includes sequentially applying more than one force vector.

21. The method of reprocessing a fiber composite part of claim 14, wherein the step of applying at least one force vector includes applying force vectors along a single axis.

22. The method of reprocessing a fiber composite part of claim 14, wherein the step of applying at least one force vector includes applying force vectors along a plurality of axes.

* * * * *